United States Patent
Hardy et al.

(10) Patent No.: US 6,612,192 B2
(45) Date of Patent: Sep. 2, 2003

(54) SCANNING APPARATUS AND METHOD THAT AVOIDS UNWANTED REACTIONS

(75) Inventors: Bruce Hardy, Longmont, CO (US); Paul Hauser, Boulder, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 36 days.

(21) Appl. No.: 09/758,410

(22) Filed: Jan. 10, 2001

(65) Prior Publication Data

US 2002/0088287 A1 Jul. 11, 2002

(51) Int. Cl.[7] .............................................. G02B 26/10
(52) U.S. Cl. ................. 74/96; 235/462.36; 235/462.43; 359/198; 359/224
(58) Field of Search ............ 74/96, 490.1; 267/140.14, 267/140.15, 140.2, 160, 292; 310/15; 358/484; 235/472.01, 472.03, 462.36, 462.43, 462.45; 359/224, 212–214

(56) References Cited

U.S. PATENT DOCUMENTS

| | | | |
|---|---|---|---|
| 3,532,408 A | | 10/1970 | Dostal ............................ 350/6 |
| 3,921,045 A | * | 11/1975 | Reich et al. ................. 359/214 |
| 4,160,177 A | | 7/1979 | Ascoli ............................ 310/22 |
| 4,619,498 A | | 10/1986 | Croiset ......................... 350/6.6 |
| 4,710,668 A | * | 12/1987 | Fima et al. ................... 310/321 |
| 4,845,688 A | * | 7/1989 | Butler .......................... 367/163 |
| 4,902,083 A | * | 2/1990 | Wells .......................... 359/214 |
| 4,968,909 A | | 11/1990 | Hulsing, II .................... 310/17 |
| 5,156,380 A | * | 10/1992 | Cerruti et al. ............... 188/378 |
| 5,277,076 A | | 1/1994 | Ostaszewski .................. 74/96 |
| 5,283,682 A | | 2/1994 | Ostaszewski ............... 359/198 |
| 5,310,157 A | * | 5/1994 | Platus .......................... 248/619 |
| 5,412,198 A | * | 5/1995 | Dvorkis ................. 235/462.36 |
| 5,481,099 A | * | 1/1996 | Dvorkis ................. 235/462.36 |
| 5,614,706 A | * | 3/1997 | Bard et al. ............. 235/462.36 |
| 5,754,327 A | | 5/1998 | Masotti et al. .............. 359/198 |
| 5,940,203 A | | 8/1999 | LaFiandra .................... 359/290 |
| 6,006,875 A | * | 12/1999 | van Namen ................ 188/378 |

* cited by examiner

*Primary Examiner*—William C Joyce
(74) *Attorney, Agent, or Firm*—Sheridan Ross P.C.

(57) ABSTRACT

A high frequency mechanical scanning assembly which is capable of one or two dimensional scanning comprises an actuator assembly, a base assembly, a coil assembly and a sensor assembly. The actuator assembly includes an upper resonant system and a lower flexure. The upper resonant system has an upper mass, a reaction mass, and an upper flexure. The top surface of the upper mass is a mirrored surface which can be used to reflect a light beam. The actuator assembly is connected to the base assembly via the lower flexure. The lower flexure connects to the reaction mass at a point close to the center of mass of the reaction mass. Movement of the upper resonant system is caused by an excitation system which includes magnets securely mounted to at least the lower mass and the coil assembly which provides driving torques to the magnets. The lower flexure is less stiff than the upper flexure. The upper flexure acts as a spring which stores and releases kinetic energy as the upper mass and reaction mass move between deflected and undeflected positions. In operation, the upper resonant system resonates about an upper translational node and a lower translational node, with the upper mass deflecting in an opposite direction as the reaction mass. The opposite deflections of the upper and reaction masses, and the location and stiffness of the lower flexure result in very little torque being transmitted to the base assembly.

23 Claims, 4 Drawing Sheets

SCANNING APPARATUS AND METHOD THAT AVOIDS UNWANTED REACTIONS

FIELD OF THE INVENTION

The present invention relates generally to scanning apparatus and, more specifically, to a mechanical apparatus for deflecting a light beam comprising a movable mirror, a reaction mass and associated driving system.

BACKGROUND OF THE INVENTION

In scanning technology, it is desirable to have a scanning apparatus capable of high scanning accuracy and rapid scan rate for scanning a target area in a conical shaped pattern. In some applications such as spacecraft, it is also desirable to minimize both power consumption due to limited power available on the platform, and vibration so as not to perturb the platform. Additionally, it is important to minimize the size and weight of the scanning apparatus due to size and weight limitations of the spacecraft. Furthermore, it is desirable to have an apparatus which is simple to fabricate, thus reducing the associated time and cost of making the apparatus.

A present practice for producing conical motion of a beam of light at high frequency uses a particular type of crystal through which the beam of light is passed and across which high voltage electric fields are established in directions perpendicular to one another by external electrical circuits. The beam of light must be polarized in a particular direction and that direction must be maintained during operation. As the electric fields are varied in magnitude and changed in polarity, the light beam is deflected through varying angles. By varying the electric fields sinusoidally at the same frequency, and by controlling the relative phase angle of the two sinusoids, the beam as it exits the crystal is deflected in a conical pattern. The pattern's cross section may be circular, elliptical, or linear depending on the relative phase angle between the two sinusoids. The voltages must have peak amplitudes of several hundred volts to produce even small deflections of the beam of light. While this practice allows the use of a relatively small and lightweight system which will not perturb the spacecraft, it requires high voltages and a significant amount of power to operate. Additionally, it requires the use of polarized light.

Another practice for scanning a beam of light is reflecting a light beam off of a mirror which is configured to oscillate, thus producing a reflected scanned beam. The mirror may be rotatably positioned on bearings and driven by a motor. While this can provide scanned beams which are conical in shape, the system may take a significant amount of power to operate, be costly to fabricate, and also transfer a torque to the platform on which it is mounted. Alternatively, the mirror may be connected to a reaction mass, with the reaction mass moved in an opposite direction of the mirror, thus reducing the torque transferred to the platform on which it is mounted. However, this type of system typically has the mirror and reaction mass coupled to one another at two opposite edges of the mirror, thus limiting the scanning to only linear scanning. Two mechanisms could be used in tandem to provide conical scanning, although this would be difficult to fabricate and may reduce the accuracy of the scanning and increase the power required to operate the system. These systems may also operate using a spring member and using mechanical resonance to reduce the amount of power to operate the system. Again however, this can make the system difficult to fabricate and also limit the system to linear scanning.

SUMMARY OF THE INVENTION

In accordance with the present invention, a high frequency mechanical scanning apparatus is disclosed that can reflect a beam directed toward its top surface in one or two dimensions, allowing linear, circular, and elliptical scanning of the reflected beam at a rapid scan rate. The scanning apparatus includes an upper resonant system which has an upper mass, an upper flexure and a reaction mass. The upper flexure is joined to the upper mass and the reaction mass, and has an associated first stiffness. A lower flexure is joined to the reaction mass and has an associated second stiffness. An excitation system is used to cause movement of at least the upper mass. The upper mass has a first width, the upper flexure has a second width and the lower flexure has a third width, with the second width being greater than the third width. The lower flexure is joined to the reaction mass in a recessed portion of the reaction mass. The upper mass, upper flexure, reaction mass and lower flexure are preferably an integral unit, which is attached to a base assembly at the lower portion of the lower flexure. The first width of the upper flexure and the second width of the lower flexure are chosen such that the second stiffness is lower than the first stiffness. In one embodiment, the second stiffness is no greater than about 10% of the first stiffness.

During operation, the upper mass deflects rotationally about an upper translational node and the reaction mass deflects rotationally about a lower translational node. The upper translational node is preferably as close as possible to the center of mass of the upper mass, and the lower translational node is preferably as close as possible to the center of mass of the reaction mass. Additionally, the lower flexure preferably has its center of rotation located adjacent to the lower translational node. The excitation system which creates the movement of the upper mass includes at least first and a second excitation magnets and a coil assembly which applies driving torques to the excitation magnets to sustain motion of the upper mass.

In one embodiment, the upper resonant system resonates about its upper and lower translational nodes. The resonance is maintained by the upper flexure acting as a spring in which energy is stored and released into the system. Thus, when the upper mass is moved from its undeflected position to a deflected position, kinetic energy is stored in the upper flexure, and as the upper mass is moved from a deflected position to an undeflected position, the stored energy is released back to at least the upper mass.

Based on the foregoing summary, a number of advantages of the present invention are noted. A mechanical scanning apparatus is provided that improves previously developed scanning apparatuses by allowing one or two dimensional scanning of a reflected beam. The reflected beam may be scanned linearly, or in an elliptical or circular pattern. The scanning apparatus operates at a resonance frequency, thus allowing it to maintain a rapid scan rate with reduced power needs. Fewer parts are required and assembly time and cost are reduced due to the highly integral nature of the design. Additionally, the apparatus transmits very little torque to the base assembly due to the stiffness and location of the connection point of the lower flexure.

Other features and advantages will be apparent from the following discussion, particularly when taken together with the accompanying drawings.

DETAILED DESCRIPTION

Figure 1:
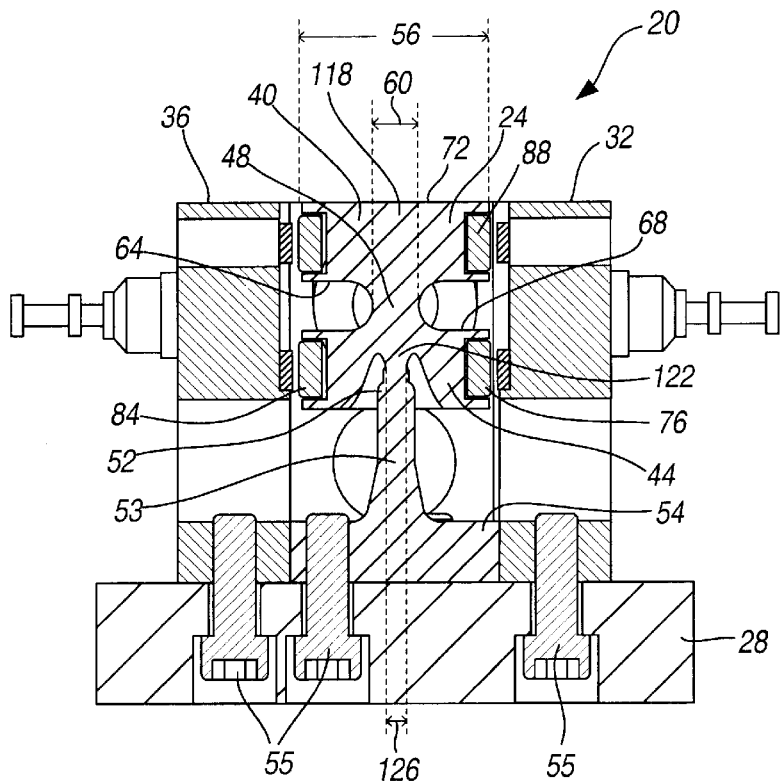
FIG. 1 is a cross-sectional view of the scanning apparatus.
Figure 2:
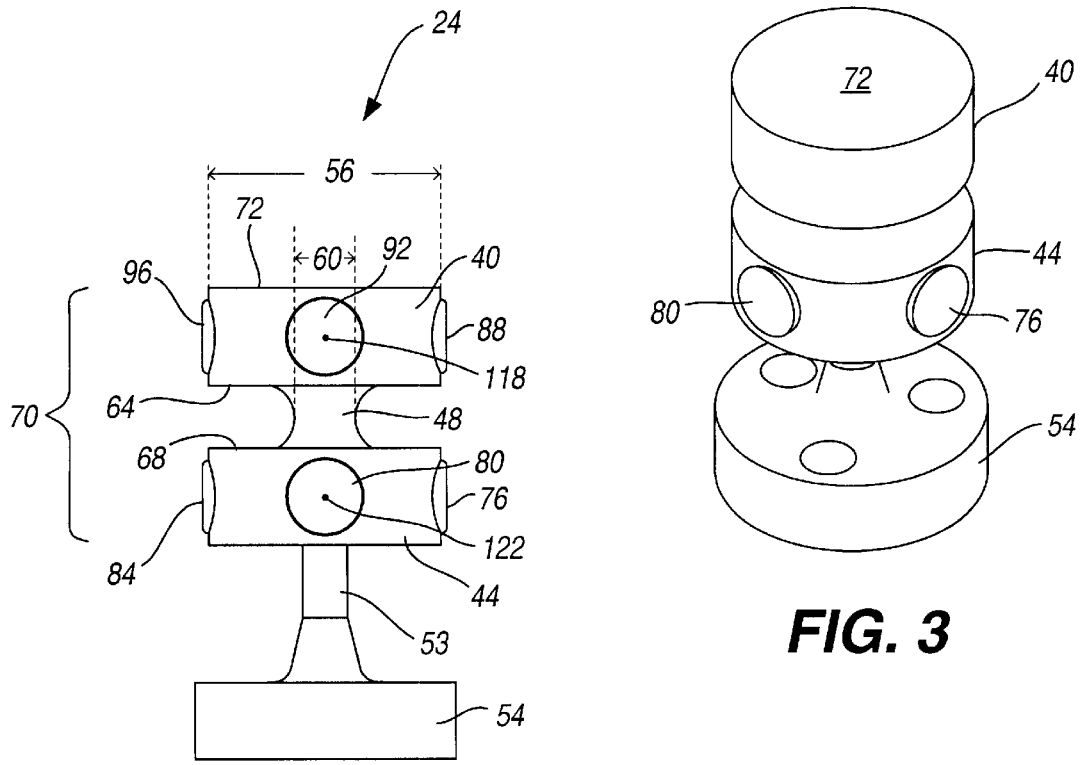
FIG. 2 is a lateral view of one embodiment of the upper resonant structure and support post.
Figure 3:
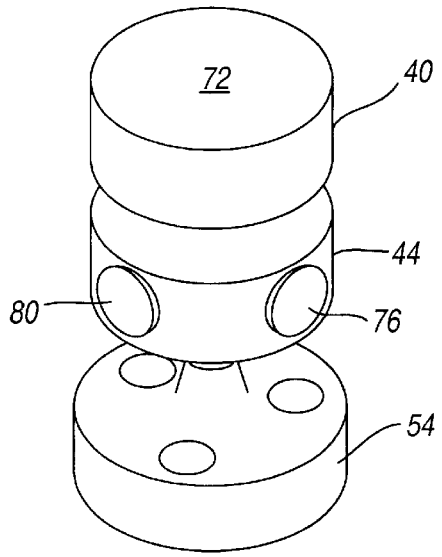
FIG. 3 is a perspective view of one embodiment of the upper resonant structure and support post.

With reference to FIGS. 1–5, the hardware setup of the scanning apparatus will be described. The scanning apparatus 20 includes an actuator assembly 24, a base unit 28, a coil assembly 32, and a sensor assembly 36. The actuator assembly 24, shown in detail in FIG. 2, has an upper mass 40 and a reaction mass 44. The upper mass 40 is connected to the reaction mass 44 by an upper flexure 48, and the reaction mass 44 is connected to the base unit 28 by a lower flexure 52 a support post 51, and a pedestal 54. The actuator assembly 24 is secured to the base unit 28 using bolts 55 inserted through the pedestal portion 54. In a preferred embodiment, the entire actuator assembly 24, including the upper mass 40, reaction mass 44, upper flexure 48, lower flexure 52 support post 53, and pedestal 54 are all made from a single piece of aluminum.

The upper mass 40 and reaction mass 44 preferably have the same, or substantially the same, first diameter 56. The upper flexure 48 has a second diameter 60 at its narrowest point and is connected to a bottom surface 64 of the upper mass 40 and to an upper surface 68 of the reaction mass 44. Taken together, the upper mass 40, upper flexure 48 and reaction mass 44 is referred to as the upper resonant system 70. The top surface 72 of the upper mass 40 is a mirrored surface, which may be highly polished aluminum of the actuator assembly 24 itself, or may be a separate reflective material which is securely mounted to the top of the upper mass 40. Alternatively, a mirrored top surface may not be required in applications not requiring deflection of a light beam.

A first excitation magnet 76 is located on a first side of the reaction mass 44, and a second excitation magnet 80 is located on a second side of the reaction mass 44. The reaction mass 44 contains a first sensor magnet 84 and a second sensor magnet (not shown) in addition to the excitation magnets 76, 80. The upper mass contains a third excitation magnet 88, a fourth excitation magnet 92, a third sensor magnet 96, and a fourth sensor magnet (not shown). In another embodiment, shown in FIG. 3, the reaction mass 44 contains two excitation magnets 76–80 and two sensor magnets (not shown), and the upper mass 40 does not contain any magnets. In still another embodiment, no sensor magnets are used, and the reaction mass 44 and the upper mass 40 each contain four excitation magnets. In this embodiment, a sensor assembly 36 is not needed, and instead two coil assemblies 32 are used. It should be noted that the coil assembly 32 and sensor assembly 36 are identical in physical design, with the difference being the electronic connection to the external circuitry. The magnets are preferably mounted on the upper mass 40 and reaction mass 44 with adhesive, such that the magnets are securely held in place. As will be understood by those of skill in the art, several different configurations of excitation and sensor magnets may be implemented on the upper mass 40 and the reaction mass 44, with appropriate changes being made to the coil assembly 32 and sensor assembly 36.

Figure 4A:
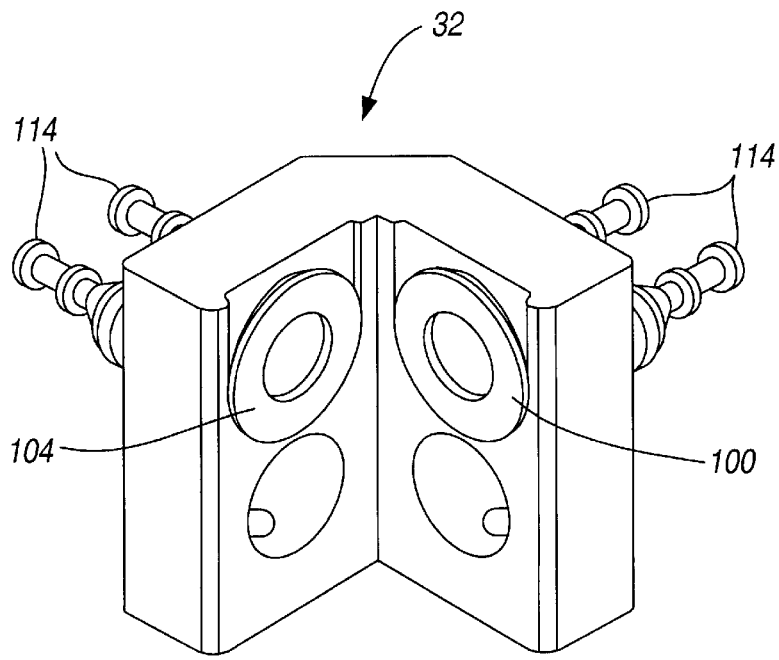
FIG. 4A is a perspective view of the coil assembly.
Figure 4B:
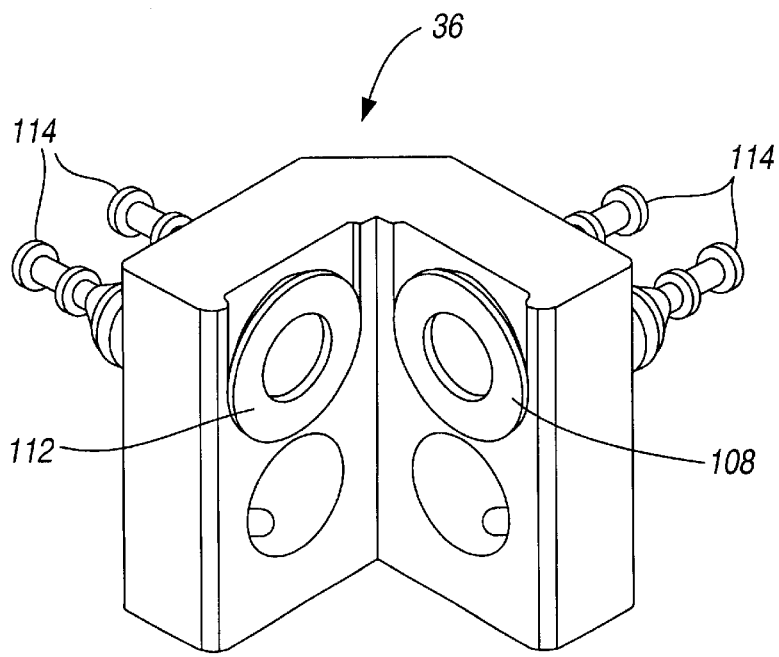
FIG. 4B is a perspective view of the sensor assembly.
Figure 5:
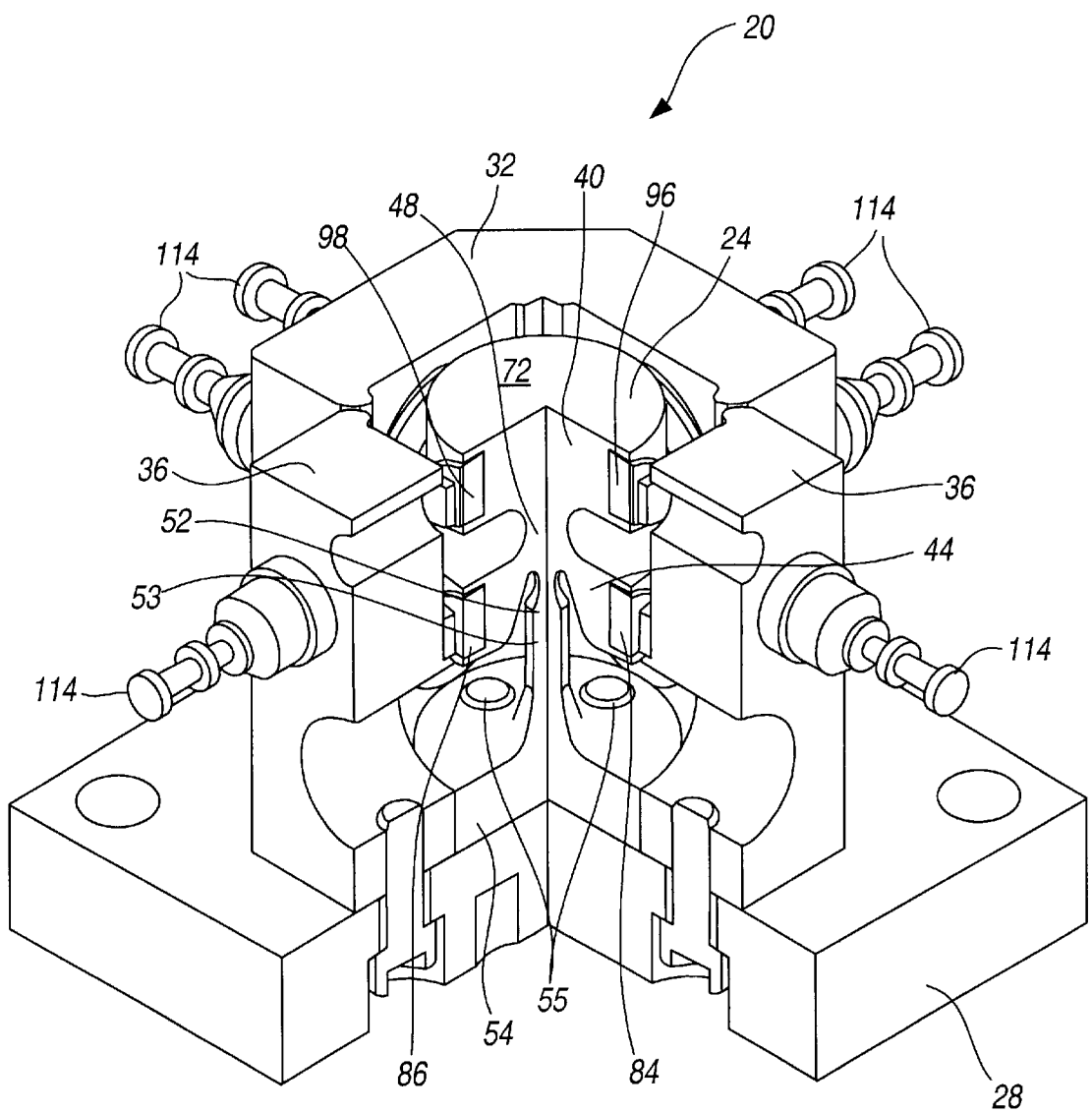
FIG. 5 is a perspective view, partially in cross section of the scanning apparatus.

As shown in detail in FIG. 4A, the coil assembly 32 contains a first excitation coil 100, and a second excitation coil 104. The sensor assembly 36, shown in detail in FIG. 4B, contains a first sensor coil 108 and a second sensor coil 112. The coil assembly 32 and sensor assembly 36 contain feed points 114, at which electrical signals can be communicated to and/or received from the coil to which the feed point 114 is electrically connected. As discussed above, alternatively, the upper mass and reaction mass may contain more or fewer excitation and sensor magnets, including no sensor magnets. In such a case, the number of sensor coils and excitation coils would be adjusted as necessary. The coil assembly 32 and the sensor assembly 36 are attached to the base unit 28 using bolts 55, as shown in FIG. 1. The excitation coils and sensor coils are mounted to the coil assembly 32 and sensor assembly 36 with adhesive such that the coils are securely held in place.

Since the upper flexure 48 is attached to a central portion of the upper mass 40 and reaction mass 44, this allows the reaction mass 44 and the upper mass 40 to deflect about their respective centers of mass in any direction. This allows a beam directed toward the top surface 72 to be scanned in one dimension (linear scanning) or two dimensions (conical scanning). This is possible because there is no mechanical restraint on the direction in which the upper mass may deflect. The upper resonant structure 70 has an upper translational node 118 which preferably corresponds to the center of mass of the upper mass 40, and a lower translational node 122 which preferably corresponds to the center of mass of the reaction mass 44. The upper translational node 118 and the lower translational node 122 are the nodes of the first mode of vibration of the upper resonant structure 70 in its free mode, that is, vibrating freely in space at its fundamental frequency. The lower flexure 52 is recessed into the reaction mass 44 and preferably attached such that the center of rotation of the lower flexure 52 is located at or near the lower translational node 122. The lower flexure 52 has a third diameter 126 at the connection point to the reaction mass 44. The third diameter 126 is selected to be smaller, along all portions of the lower flexure 52, than the second diameter 60 of the upper flexure. This acts to create a connection between the reaction mass 44 and the support post 53 that is less stiff than the connection between the reaction mass 44 and the upper mass 40. In one embodiment the third diameter 126 is selected to make the stiffness of the connection between the reaction mass 44 and the support post 53 between ¹⁄₁₀ to ¹⁄₁₀₀ the stiffness of the connection between the upper mass 40 and the reaction mass 44. The recessed location of the attachment of the lower flexure 52 and its relatively small stiffness helps to insure that the upper resonant structure 70 is independent from the base assembly 28, and that very little force is communicated to the base assembly 28 when the upper resonant structure 70 is resonating.

Figure 6:
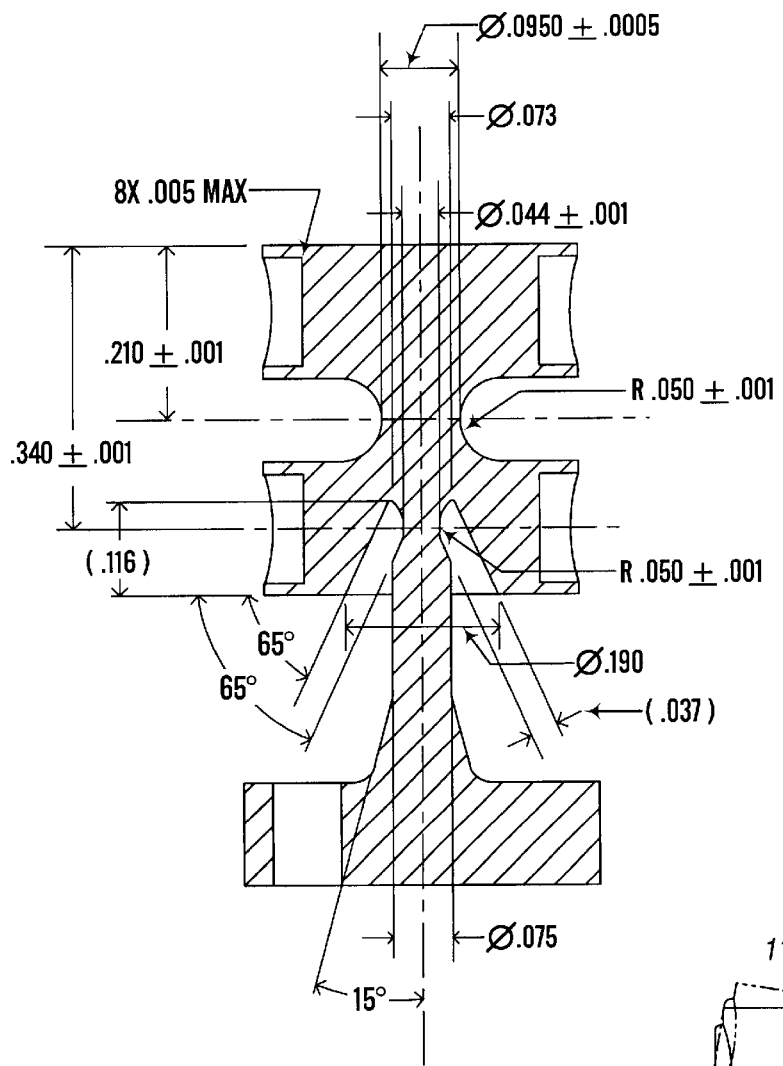
FIG. 6 is a cross-section view showing measurement data for one embodiment of the upper resonant system and the lower flexure.

FIG. 6 shows the dimensional measurements for the actuator assembly of one embodiment. Using the dimensions as shown in this example and fabricating the actuator assembly 24 from a single piece of aluminum, the frequency of operation would be preferably approximately 20 kHz and in the range of 15 kHz-25 kHz. The design is easily modified to provide frequencies in excess of 50 kHz.

With reference to FIGS. 1–7, the operation of the actuator system 20 will be described. The system starts in an inactive and unperturbed state, as shown by the solid lines of the actuator assembly 24 in FIG. 7. First, the first excitation coil 100 is activated using a first activation signal, which creates a force on the first excitation magnet 76. The first excitation coil 100 is then deactivated while at the same time the second excitation coil 104 is activated using a second activation signal. The activation of the second excitation coil 104 creates a force on the second excitation magnet 80. These steps of activating and deactivating are repeated in a preset pattern, with the timing of the preset pattern related to a resonant frequency of the actuator assembly 24. If the frequency of the applied force is at or near the resonant frequency, the actuator assembly 24 will begin to resonate. The amplitude of this resonance will grow over time. As the amplitude of the resonance grows, the magnitude of the first activation signal and second activation signal can be reduced, as less energy is required to keep the actuator assembly 24 resonating at a given amplitude once that amplitude of resonance is reached. In steady-state operation, the driving torques applied by the excitation coils sustain the motion by overcoming small damping torques produced by the upper flexure 48 and the lower flexure 52.

Figure 7:
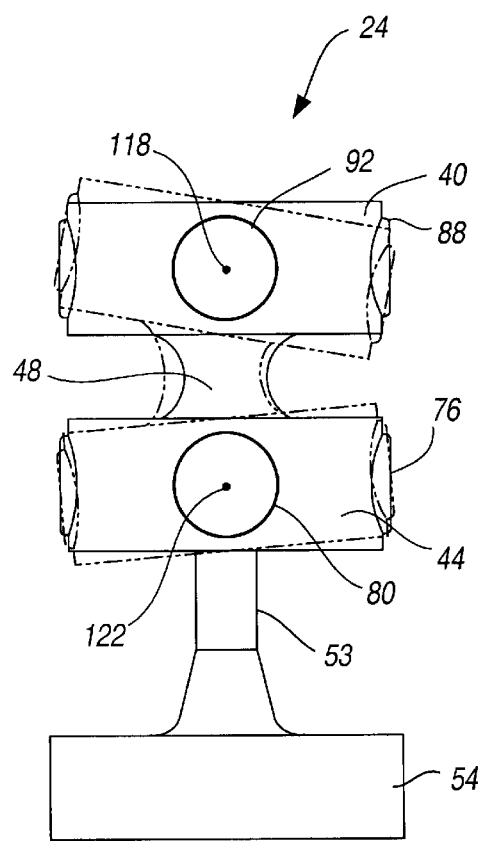
FIG. 7 is a lateral view of the upper resonant system and lower flexure showing undeflected and deflected positions of the upper mass and reaction mass.

The resonance results in the upper mass 40 deflecting about the upper translational node 118, and the reaction mass 44 deflecting about the lower translational node 122, with the reaction mass 44 and the upper mass 40 deflecting in opposite directions of each other. A maximum deflection is shown by the dashed line in FIG. 7. It should be noted that the maximum deflection shown by the dashed line in FIG. 7 is shown for illustrative purposes and is greatly exaggerated, for clarity, compared to typical deflections of the upper mass 40 and reaction mass 44. This deflection in opposite directions results in the torque generated from the deflection of the upper mass 40 being counteracted by the opposite torque generated from the deflection of the reaction mass 44, resulting in very little torque being transmitted to the base assembly 28. The frequency at which the actuator assembly 24 will resonate is dependent upon the second diameter 60 of the upper flexure 48, with a smaller second diameter 60 resulting in a lower resonant frequency.

The stiffness of the upper flexure 48 causes the upper flexure 48 to act like a spring. When the upper mass 40 and reaction mass 44 are in motion, the kinetic energy of each mass is stored in and released from the upper flexure 48. When the masses reach their maximum deflection in a certain direction, all of their kinetic energy associated with that direction of movement has been transferred into the upper flexure 48. The upper flexure 48 then releases this stored energy back into the upper mass 40 and reaction mass 44 causing both masses to move back to an undeflected position, at which point all of the stored energy has been released back into the masses from the upper flexure 48. At this point, the upper mass 40 and the reaction mass 44 are deflecting at their maximum angular velocity, and the kinetic energy of the upper mass 40 and the reaction mass 44 cause each mass to continue to move in that direction of travel. At this time, the upper flexure 48 again starts to store this kinetic energy until the upper mass 40 and the reaction mass 44 reach their maximum opposite deflection, and the cycle is repeated.

When the actuator assembly 24 is resonating, the upper mass 40 deflects about the upper translational node 118, causing a light beam directed toward the top surface 72 to be reflected in a pattern defined by the amount of deflection of the upper mass 40. Two dimensional movement can be obtained by placing the first excitation magnet 76 and the second excitation magnet 80 on the reaction mass 44 such that they are sufficiently close to one another to cause two dimensional movement. Thus, the magnets are within 180° of one another, and preferably at 90° to one another. The first excitement coil 100 and second excitement coil 104, located on the coil assembly 32 are arranged such that they can provide sufficient driving torque to the first and second excitation magnets 76, 80, and are preferably located opposite the excitation magnets 76, 80. In one embodiment, a third excitement magnet 88 and fourth excitement magnet 92 are placed on the upper mass 40. These additional excitation magnets 88, 92 are preferably mounted on the upper mass 40 at the same relative location as the excitation magnets 76, 80 are located on the reaction mass 44. The additional excitation magnets 88, 92 are arranged in the same magnetic orientation relative to the excitation magnets 76, 80 on the reaction mass 44, such that when an excitation coil is activated an opposite force is created on each of the masses by virtue of the opposite direction of current flow in the portions of the coils adjacent to the magnets. The addition of the third and fourth excitation magnets 88, 92 allows the actuator assembly 24 to achieve and maintain resonance using a reduced amount of electrical current and power.

The magnitude and the pattern of the two dimensional movement can be controlled by changing the relative amplitude or phase of the first activation signal and the second activation signal. For example, if a circular pattern were desired, the first and second activation signals would have the same amplitude and be 90° out of phase. If an oval pattern were desired the amplitude of one of the activation signals could be adjusted. Also, the phase of the activation signals could be adjusted to create an oval pattern. Two dimensional movement is possible because the upper flexure and lower flexure do not act as mechanical restraints on the direction of deflection. One dimensional movement can be obtained by activating and deactivating only one coil assembly. One dimensional movement may also be obtained and controlled by activating the two coils in phase or out of phase with one another. The direction of the one dimensional movement can be controlled by changing the relative amplitude of the first activation signal and second activation signal.

The location and rate of movement of the reaction mass 44 is determined using the sensor magnets and sensor coils. The flux of the sensor magnets couples with the sensor coils, providing a signal which is used in determining the location and movement of the reaction mass 44. Additionally, the upper mass may also contain sensor magnets, as discussed above, in which case the location and movement of the upper mass 40 can also be determined. Additionally, as discussed above, the sensor magnets could be used alternatively as excitation magnets, with a corresponding change to the electrical connection of the sensor coils.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. A scanning apparatus, comprising:
   an upper resonant system including an upper mass, an upper flexure and a reaction mass, said upper flexure being joined to said upper mass and said reaction mass, said upper flexure being associated with a first stiffness;
   a base assembly;
   a lower flexure joined to said reaction mass and said base assembly, and being associated with a second stiffness, said first stiffness being greater than said second stiffness; and
   an excitation system associated with said upper resonant system for causing movement of at least said upper mass, wherein substantially all reaction forces resultant from the movement of said upper mass are isolated from said base assembly.

2. An apparatus, as claimed in claim 1, wherein:
   said upper mass, said lower flexure, said reaction mass and said lower flexure constitute an integral unit.

3. An apparatus, as claimed in claim 1, wherein:
   said second stiffness is no greater than about 10% of said first stiffness.

4. A scanning apparatus, comprising:
   an upper resonant system including an upper mass, an upper flexure and a reaction mass, said upper flexure being joined to said upper mass and said reaction mass, said upper flexure being associated with a first stiffness;
   a lower flexure joined to said reaction mass and being associated with a second stiffness, said first stiffness being greater than said second stiffness; and
   an excitation system associated with said upper resonant system for causing movement of at least said upper mass,
   wherein said upper mass has a first width, said upper flexure has a second width and said lower flexure has a third width, with said second width being greater than said third width.

5. A scanning apparatus, comprising:
   an upper resonant system including an upper mass, an upper flexure and a reaction mass, said upper flexure being joined to said upper mass and said reaction mass, said upper flexure being associated with a first stiffness;
   a lower flexure joined to said reaction mass and being associated with a second stiffness, said first stiffness being greater than said second stiffness; and
   an excitation system associated with said upper resonant system for causing movement of at least said upper mass,
   wherein said lower flexure is joined to said reaction mass in a recessed portion thereof.

6. A scanning apparatus, comprising:
   an upper resonant system including an upper mass, an upper flexure and a reaction mass, said upper flexure being joined to said upper mass and said reaction mass, said upper flexure being associated with a first stiffness;
   a lower flexure joined to said reaction mass and being associated with a second stiffness, said first stiffness being greater than said second stiffness; and
   an excitation system associated with said upper resonant system for causing movement of at least said upper mass,
   wherein said upper mass has an upper translational node and said reaction mass has a lower translational node that corresponds to a center of mass thereof, said lower flexure having a center of rotation that is located adjacent to said lower translational node.

7. A scanning apparatus, comprising:
   an upper resonant system including an upper mass, an upper flexure and a reaction mass, said upper flexure being joined to said upper mass and said reaction mass, said upper flexure being associated with a first stiffness;
   a lower flexure joined to said reaction mass and being associated with a second stiffness, said first stiffness being greater than said second stiffness; and
   an excitation system associated with said upper resonant system for causing movement of at least said upper mass,
   wherein said excitation system includes at least first and second excitation magnets and a coil assembly and in which said coil assembly applies driving torques to sustain motion of said upper mass.

8. A scanning apparatus, comprising:
   an upper resonant system that includes an upper mass having a first width, an upper flexure having a second width and a reaction mass, said upper flexure joined to each of said upper mass and said reaction mass;
   a lower flexure having a third width that is less than said second width, said lower flexure being joined to said reaction mass; and
   an excitation system associated with at least one of said upper mass and said reaction mass for use in causing movement of at least said upper mass.

9. An apparatus, as claimed in claim 8, wherein:
   said upper mass, said reaction mass and said upper flexure constitute an integral unit.

10. An apparatus, as claimed in claim 9, wherein:
    said upper mass, said upper flexure, said reaction mass and said lower flexure constitute an integral unit.

11. An apparatus, as claimed in claim 8, further including:
    a base assembly joined to said lower flexure, wherein a first connection is provided between said reaction mass and said base assembly and a second connection is provided between said reaction mass and said upper mass and in which said first connection is less stiff than said second connection.

12. An apparatus, as claimed in claim 8, wherein:
    said upper flexure constitutes a spring in which energy is stored and released relative to at least said upper mass.

13. An apparatus, as claimed in claim 8, wherein:
    said lower flexure has a first end that is provided in a recessed portion of said reaction mass.

14. A method for scanning, comprising:
    providing a base assembly and an upper resonant system that includes an upper mass, an upper flexure joined to said upper mass, and a lower flexure and in which said upper resonant system includes a reaction mass joined to each of said upper flexure and said lower flexure, said lower flexure also being joined to said base assembly;
    associating an excitation system with said upper resonant system; and
    causing said upper mass to move using an electrical signal generated by said excitation system, said causing step including storing energy using said upper flexure,
    wherein substantially all reaction forces that occur during said causing step are isolated from said base assembly.

15. A method, as claimed in claim 14, wherein:
    said causing step includes releasing stored kinetic energy to at least said upper mass.

16. A method, as claimed in claim 14, wherein:

said storing step includes storing kinetic energy in said upper flexure when said upper mass is moved from an undeflected position to a deflected position.

17. A method, as claimed in claim 14, wherein:

said causing step includes causing said upper mass to move simultaneously in two dimensions.

18. A method, as claimed in claim 14, wherein:

said causing step includes using said excitation system to overcome damping resulting from at least said upper flexure.

19. A method, as claimed in claim 14, wherein:

said causing step includes using a magnetic field produced by said electrical signal to move said upper mass.

20. A method, as claimed in claim 14, wherein:

said excitation system includes a coil assembly located adjacent to said upper mass.

21. A method, as claimed in claim 20, wherein:

said causing step includes applying driving torques to at least one excitation magnet located in said upper mass using a magnetic field produced by said coil assembly.

22. A method, as claimed in claim 21, wherein:

said driving torques are applied to said upper mass at a resonant frequency of said upper resonant system.

23. A method for scanning, comprising:

providing a base assembly and an upper resonant system that includes an upper mass, an upper flexure joined to said upper mass, and a lower flexure and in which said upper resonant system includes a reaction mass and with said reaction mass being joined to each of said upper flexure and said lower flexure, said lower flexure also being joined to said base assembly;

associating an excitation system with said upper resonant system; and causing said upper mass to move using said excitation system, said causing step including storing energy using said upper flexure, wherein said base assembly is not subjected to substantially any of the reaction forces that occur during said causing step.

* * * * *